Jan. 23, 1940. G. E. HALLENBECK ET AL 2,187,854
ADAPTABLE MACHINE TOOL
Filed Feb. 24, 1937 11 Sheets-Sheet 9

Inventors
George E. Hallenbeck
and
Conrad Jobst
By
Attorney

Patented Jan. 23, 1940

2,187,854

UNITED STATES PATENT OFFICE 2,187,854

ADAPTABLE MACHINE TOOL

George E. Hallenbeck and Conrad Jobst, Toledo, Ohio, assignors to Baker Brothers, Inc., Toledo, Ohio, a corporation of Ohio Application February 24, 1937, Serial No. 127,455

14 Claims. (Cl. 90—21)

This invention relates to work and tool placings and controls.

This invention has utility when incorporated in horizontally projectable, rotary holders adapted substitutively to mount tools, and complementary holder mounting means adjustable up and down, to and fro, and transversely, substitutively, as well as definitely, interchangeably placing a holder, as for work, together with a vise adapted therefor.

Referring to the drawings.

Tool table

Figure 3:
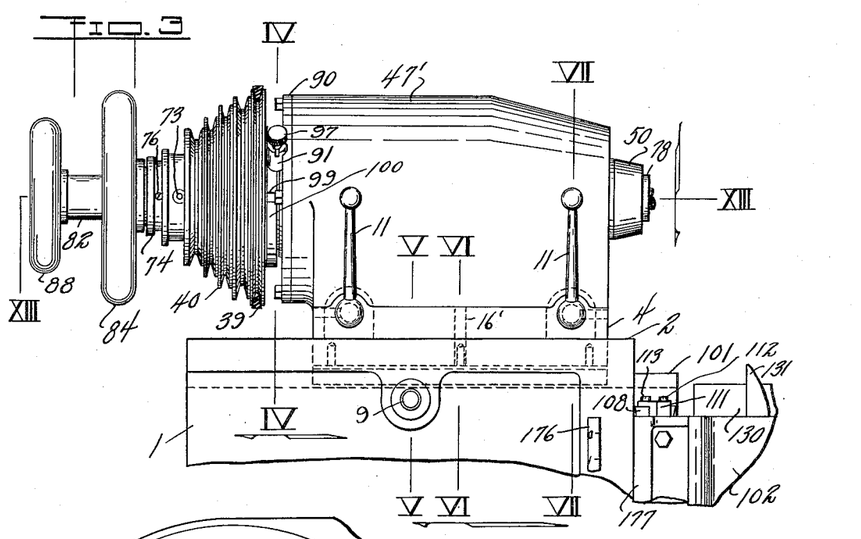
Fig. 3 is a detail view, with parts broken away, of auxiliary frame features for the rotary or tool holder as viewed from the left in Fig. 1.
Figures 4, 5, 6:
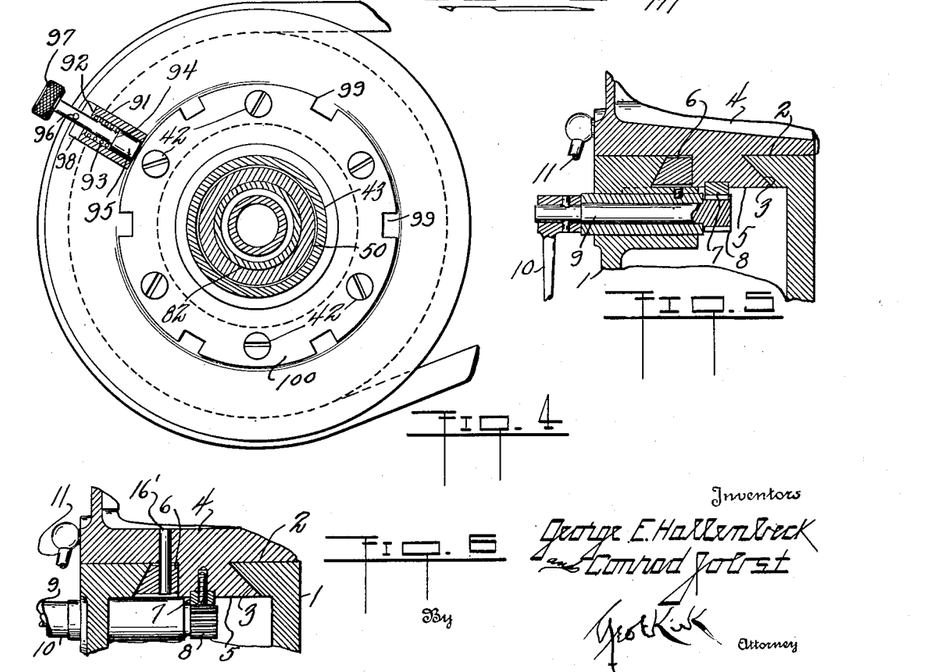
Fig. 4 is a section on the line IV—IV, Fig. 3.
Fig. 5 is a section on the line V—V, Fig. 3.
Fig. 6 is a section on the line VI—VI, Fig. 3.
Figures 7, 10, 11, 12:
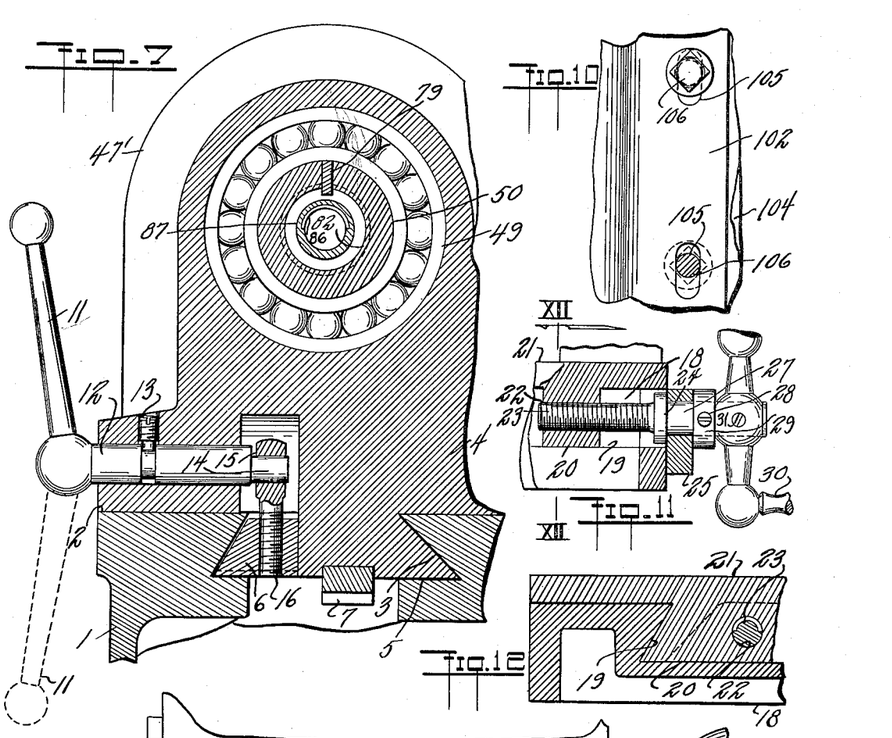
Fig. 7 is a section on the line VII—VII, Fig. 3.
Fig. 10 is a fragmentary view from the line X—X, looking into Fig. 8.
Fig. 11 is a section on the line XI—XI, Fig. 2.
Fig. 12 is a section on the line XII—XII, Fig. 11.

Main frame 1 (Fig. 1) is primarily of general pedestal contour having upper portion at its supporting face 2 providing dovetail guide-way 3 (Figs. 5, 7). Mounted on this face 2 is primary or auxiliary frame 4 having complementary fragmentary dovetail 5 for seating in the way 3. Dovetail section 6, coacting with fragmentary dovetail 5 is effective for definitely fixing the adjusted position of the auxiliary frame 4 through the medium of the guide 3 of the main frame 1. This dovetail section 5 mounts rack 7 (Figs. 1, 5) with which coacts pinion 8 on shaft 9 provided with handle 10. Accordingly, rotation of this shaft 9, by means of the handle 10, clockwise, shifts the feed of the frame 4 to the right (Fig. 3); and counter-clockwise, reversely, or to the left. As the adjustment desired is obtained, handles 11 (Figs. 1, 3, 7) may be rocked 180° and thereby each through a shaft 12, held from longitudinal movement by a set screw 13, to be effective to shift an eccentric pin 14, having thereon an eye 15 of a screw stem 16 anchored with the dovetail section 6.

It is thus seen that with the arms or handles 11 upward the dovetail is released or collapsed so that the handle 10 may readily effect the shifting of the auxiliary frame 4 to the desired position relatively to the main frame 1. As such position is reached, a swinging of the arms 11 downwardly pulls the dovetail section 6, as guided by pin 16' (Fig. 6), into the complementary overhang section portion of the way 3, thereby snugly locking and holding this auxiliary frame 4 in the position, say sufficient to retain the frame 4 even under arduous operating conditions, notwithstanding the unclamped adjustment has been one readily effected.

This frame 4 has ledge-providing seat portion 17 (Fig. 1) laterally from and parallel to the dovetail 5, 6. Assembled with this frame 4 is frame section 18 at this seat 17. This frame section 18 (Figs. 11, 12) has dovetail guide-way 19, into which extends complementary dovetail 20 of secondary auxiliary frame 21. This frame 21 has, through the depending dovetail-providing portion 20, internally threaded eye 22 with which threaded stem 23 may engage. This stem 23 is provided with collar 24 abutted by guide block 25 anchored with the frame section 18 (Fig. 2) by screws 26. From this shoulder 24 (Fig. 11), protruding through this guide plate 25, is shaft 27 from this threaded portion 23. Set screw 28 through collar 29 anchors this collar to oppose the shoulder 24 and thereby holds this threaded portion 23 and the shaft 27 fixed against longitudinal movement relatively to the frame section 18, but free to rotate therein as actuated by handle 30, connected to this shaft 27 by set screw 31. The angle of friction between the threaded portion 23 with the eye 22 is sufficient to hold the secondary frame 21 in the adjusted position.

*Tool drive*

Figure 2:
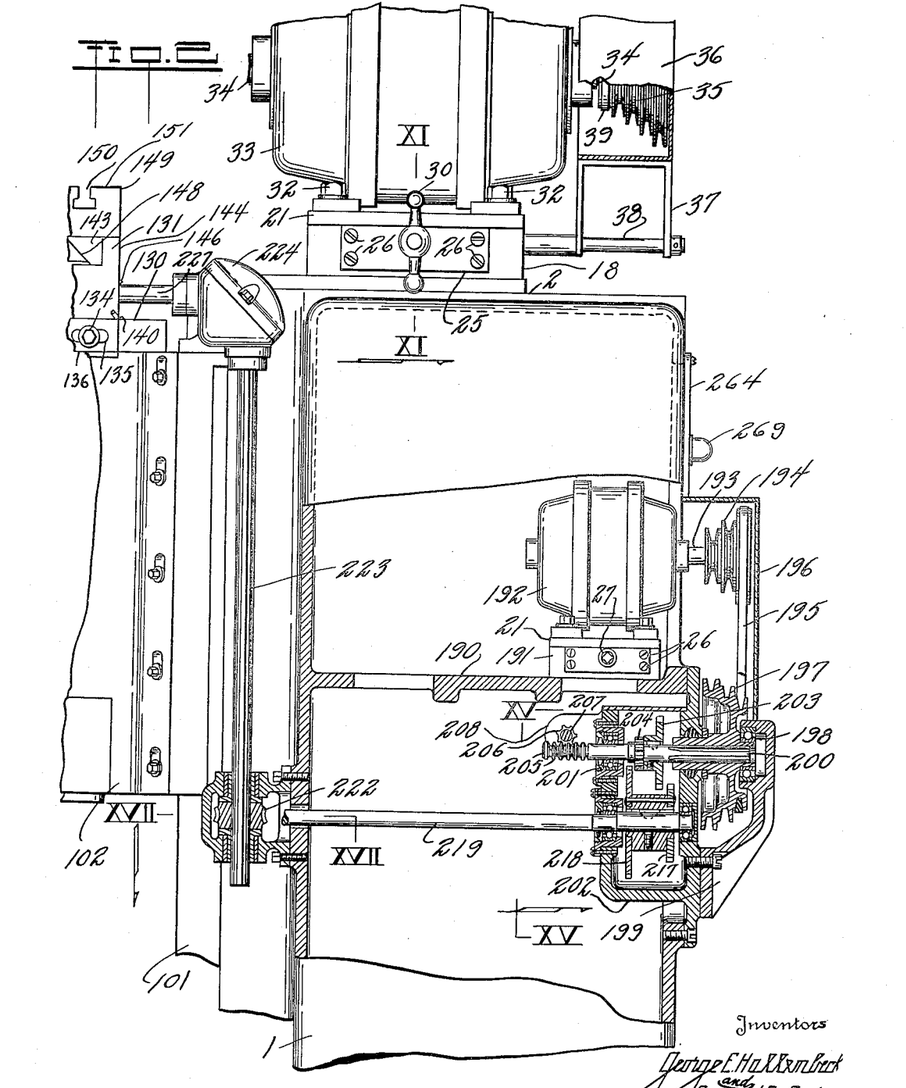
Fig. 2 is a view from the right of Fig. 1, with parts broken away.
Figures 13, 14:
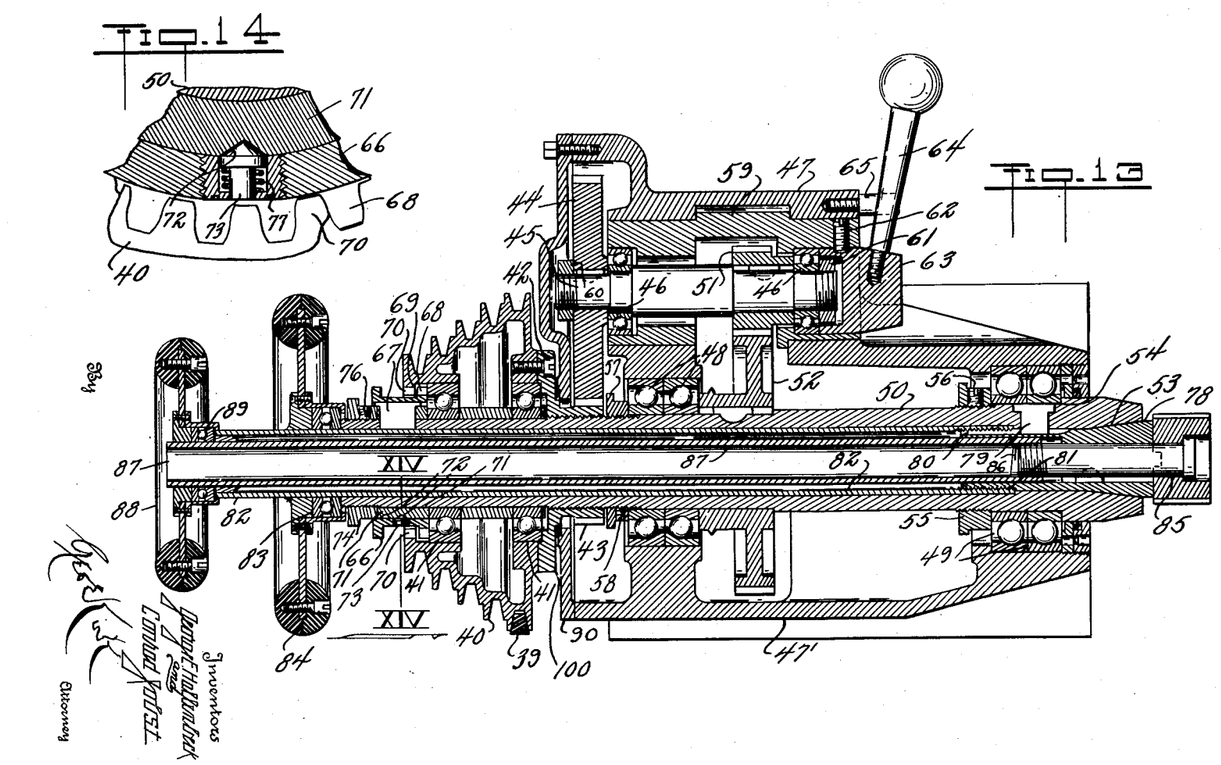
Fig. 13 is a section on the line XIII—XIII, Fig. 3.
Fig. 14 is a section on the line XIV—XIV, Fig. 13.

This secondary or auxiliary frame 21 has fixedly mounted therewith by bolts 32 (Fig. 2) electric motor 33 having shaft 34 carrying stepped V-pulley 35 in housing 36, mounted by bracket 37, carried by pin 38 from the frame 18. V-belt 39 from a selected step of the pulley 35 may extend to companion, oppositely stepped V-pulley 40 (Figs. 3, 13). This V-pulley stepped section or cone 40 is mounted on bearings 41, and by bolts 42 is assembled with pinion 43 in mesh with gear 44 fixed with shaft 45 in bearings 46 carried within housing section 47 fixed with housing section 47' as a part of the frame 4.

This housing section 47' is provided with bearings 48, 49, about sleeve or tube 50, about which tube 50 the bearings 41 are located. The shaft 45 in the housing 47 has fixed therewith pinion 51 in mesh, as a speed reduction drive, with gear 52 keyed with the sleeve 50. This sleeve 50 has interior taper terminus 53 projecting beyond the bearing 49 effective as a rotary holder for substitutive tools. As such tapered sleeve side of the bearings 49, this sleeve 50 has shoulder 54. Oppositely thereto and about this sleeve 50 at the bearings 49 is nut 55 threaded with the sleeve 50 and anchored by set screw 56 in adjusted position with such sleeve to oppose the shoulder 54. This sleeve 50 is accordingly held against longitudinal shifting relatively to the frame 47' while free to rotate therein. Additionally, as to the bearings 48, there is nut 57 held by set screw 58 opposing the gear 52, and thus holding the drive for effective assembly in rotating this sleeve 50.

The sheaves or stepped cone pulleys 35, 40, provide for changes of speed in this drive. These bearings 46 within the housing 47 are spaced from such housing 47 and mounted by eccentric 59. This eccentric 59 has coaction with the shaft 45 against the longitudinal movement of such shaft due to nut 60 having thread engagement with the shaft 45 adjacent the gear 44, and nut 61 having thread engagement therewith remote from the gear 44 and spaced from the pinion 51 by one of the bearings 46. This latter bearing 46 has held adjacent thereto by set screw 62 cap 63 with which handle 64 engages and is thus anchored with the eccentric 59. This handle 64 in horizontal position abuts pin 65 and thus holds the eccentric 59 in meshing relation for the gear 44 with the pinion 43 and for the pinion 51 with the gear 52.

Upon rocking this handle 64 (Figs. 1, 13) upward or counter-clockwise the eccentric 59 has its thicker portion relative to the shaft 45 shifted from the side remote from the sleeve 50 toward such sleeve 50. This radially shifts this shaft 45 and its axis relatively to the axis of the sleeve 50 and uncouples the drive for the sleeve 50 as from the pulley 40 by shifting the gear 44 out of mesh with the pinion 43 and the pinion 51 out of mesh with the pinion 52. Thus, notwithstanding the motor 33 may be still running, it is practicable to disconnect the sleeve 50 and thus stop the rotation of this holder portion 53.

Adjacent the bearing 41 there is mounted about the sleeve 50 clutch member 66 axially fixed to the sleeve 50 by key 67. This clutch member 66 has toothed portion 68 which may be clear under overhang 69 of teeth 70. This key 67 from the clutch member 66 and engaging the sleeve 65 passes through sleeve element 71 having longitudinally thereon seats 72. Spring thrust pin 73 (Fig. 14) is a yieldable holding means for this clutch member 66 axially as to the sleeve 50, for this sleeve element 71 is held against shifting relatively to the bearing 41 by collar 74 threaded with the sleeve 50 and anchored in threaded position by set screw 76. Axial shifting of the clutch member 66, effecting radial movement of the pin 73 against the resistance of spring 77, may, in movement away from the pulley 40, bring the toothed portion 68 into mesh with the toothed portion 70 and thereby directly clutch this driving pulley 40 with the driven sleeve 50.

At the taper portion 53 in the sleeve 50, there may be placed a tool holder or collet 78 held against relative rotation by key 79. This collet or holder 78, as provided with externally threaded portion 80, has such engaged by threaded portion 81 on inner tubular member 82 within the sleeve 50. This tubular member 82 passes beyond the remote end of the sleeve 50 and through thrust bearing 83 to have hand wheel 84 fixed therewith. Rotation of this hand wheel 84 relatively to the sleeve 50 may draw the collet 78 into binding position at the taper 53 or release such for thrusting axially outward clear of this sleeve 50. In the event a smaller tool or other element be centered by the collet 78, such minor element 85 may have threaded engagement with internally threaded portion 86 of supplemental inner tube 87 extending through the tube 82 and having hand wheel 88 thereon spaced from the tube 82 by thrust bearing 89. Accordingly, these hand wheels 83, 88, provide in one direction of rotation a longitudinal or axial shortening in pulling the collet holder or tool into anchored position with the rotary driving sleeve 50, while the reverse direction of rotation frees such collet holder or tool from such axial clamping so that such may be readily removed.

There is, accordingly, for this rotary element or holder, the main frame 1, primary or auxiliary frame 2, with its section 18, and rotary secondary auxiliary frame 50. There is provision herein for nicety in ranges of adjustment. The handle 30 (Fig. 1) coacts in shifting the motor 33 toward or from the sleeve or secondary auxiliary frame 50 in effecting the desired adjustment for the driving belt 39. This primary auxiliary frame unit has its adjustment relatively to the frame 1 effective through the handle 10.

When occasion arises for operating the hand wheels 84 or 88, it is desirable that the frame or sleeve 50 be anchored against rotation. To this end, the housing 47' is provided with closure or end 90 carrying boss 91 (Figs. 3, 4, 13) in which, against overhang 92, is spring 93 opposing shoulder 94 of pin 95 having cross pin 96 adjacent knurled handle 97. With the shoulder or head 94 in the boss 91 against the spring 93, the handle 97 may be pulled and angularly shifted to bring the pin 96 clear of slot 98, and this head 94 is thus held retracted from notches 99 in plate or flange 100, fixed with the pinion 43 and assembled with the step pulley 40 by the bolts 42. With this head 94 engaging the notch this sleeve 50 is held against angular rotation and the manual operation for assembling or disconnecting a tool through the medium of the wheels 84, 80, may then be readily accomplished. As such work is effected, it is only necessary to engage the handle 97 withdrawing the pin 95 against the resistance of spring 93 and rotate so that the cross pin 96 is in the slot 98 and the head 94 is in the selected notch 99.

*Work table*

Figure 8:
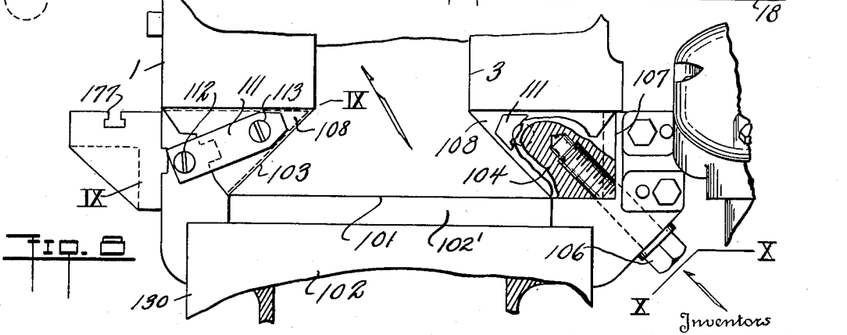
Fig. 8 is a fragmentary view of the mounting guides carrying the work table or auxiliary frame, looking down from the right of Fig. 3.

This main frame 1 has upwardly extending dovetailed guide 101 (Figs. 1, 2, 8) in an intersecting direction or toward the horizontally extending guide across the top of this pedestal base or main frame 1. This dovetail guide 101 is embraced by primary auxiliary work table element or frame 102 having fixed therewith wedge guide element 103 and spaced therefrom by clearance 102' is opposing adjustable wedge 104, thereby effecting embracing of this dovetail 101 from this primary auxiliary frame 102. This primary frame 102 has slots 105 (Fig. 10) with which engage bolts 106 extending to the wedge 104, thereby effective to adjust such wedge 104 along the beveled face 107 of the auxiliary frame 102. This is an effective lost motion provision or take-up, insuring nicety of adjustment for the auxiliary frame 102 against even vibration during working operation.

Figure 9:
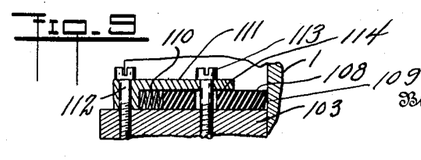
Fig. 9 is a section on the line IX—IX, Fig. 8.

This upwardly extending dovetail guide 101 has the work faces coacting with the edges 103 protected against foreign material, especially metal turnings, borings, filings or other particles. To this end, fiber or pyroxylin block 108 (Figs. 8, 9) of V- or wedge-form, has tapered faces 109 so that there is effective line contact at the upper side of such block as to the wear faces, and this adjustment is maintained yieldably by spring 110 held in position by block 111, anchored by screw 112 clear of the wear block 108, and screw 113 through opening 114 in the wear block 108. This is an effective wiper, maintaining the guide faces clear of material which might otherwise score or detract from the nicety of guide operation.

This main frame 1 has adjacent the guide 101 a projecting base 115 (Fig. 1) keyed with which, by pin 115', is upstanding threaded rod or screw 116 parallel to the guide 101. This fixed screw 116 (Fig. 18) extends upwardly through opening 117 in knee extension 118 of this primary auxiliary frame 102. Adjacent the opening 117, bearings 119 mount nut 120 carrying bevel pinion 121 in mesh with bevel pinion 122 fixed with upwardly inclined shaft 123 having bearing 124 in tubular portion 125. This portion 125 has set screw 126 positioning sleeve 127 carrying outwardly from this portion 125 bushing 128 centering this shaft 123 adjacent handle 129. Accordingly, by rotating this handle 129, there is effected rotation of the nut 120 held against axial movement relatively to the auxiliary frame 102. This means that this nut effects travel along this fixed screw 116 and the member or frame 102 is thus adjusted along the pedestal 1 for greater or less clearance as to the base 115.

Figure 1:
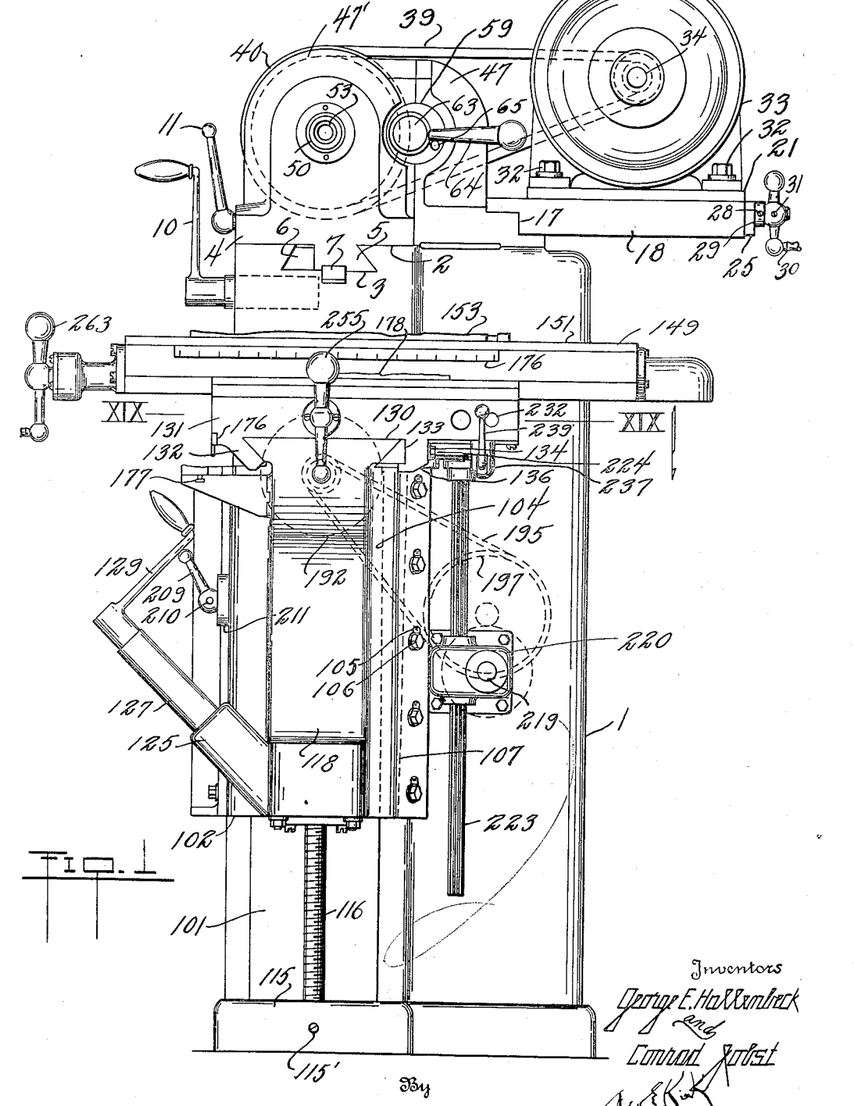
Fig. 1 is a front elevation of a machine embodying the invention.

The auxiliary frame 102 has dovetail horizontally-extending guide or top portion 130 (Fig. 1). With this coacts secondary auxiliary frame 131 having fixed overhang 132 and opposing adjustable overhang 133 completing assembly with the dovetail 130. Bolts 134 through slots 135 (Figs. 2, 21) in drop L-shaped or flange portion 136 of the frame 131 are bolts which directly engage the adjustable overhang 133. The slots 135, as the bolts 134 are slackened off, permit shifting of this overhang 133 longitudinally of the guide 130 for taper side 137 (Fig. 25) so to coact with the L-shaped holder 136 that there is provision for clearance or clearance take-up as to the guide 130 for this frame 131, thus making possible retention of desired working nicety for holding against vibration even in machine operation. This secondary auxiliary frame 131 is so directed by the guide 130 that it may move horizontally relatively to the primary auxiliary frame 102.

Occasion is here taken against material as from the work acting on the guide surface. To this end, the frame 131 has inclined way 138 (Figs. 21, 24, 27) in which is disposed zig-zag spring strip 139 to thrust fiber or pyroxylin bar 140 from the member 131 down toward the guide 130 so that its inclined face 141 may be an effective wiper against deleterious foreign material. Accordingly, in this clearing action travel of the frame 131 toward the guide 101, there is provision for free spilling in the clearance 102'.

This secondary auxiliary frame is provided with wedge-shaped fixed guide 142 (Figs. 21, 27) and companion opposing adjustable guide 143. Flange 144 from the auxiliary frame 131 has slot 145 (Fig. 25) in the plane of the angular face through which extends the bolt 146, thus adjusting this wedge 143 as shifted longitudinally of the holder 144 to render inclined way 147 effective as a take-up to provide such reduced amount of clearance as may be desired for snugly locating dovetail guide 148 fixed with tertiary auxiliary frame 149.

Figure 21:
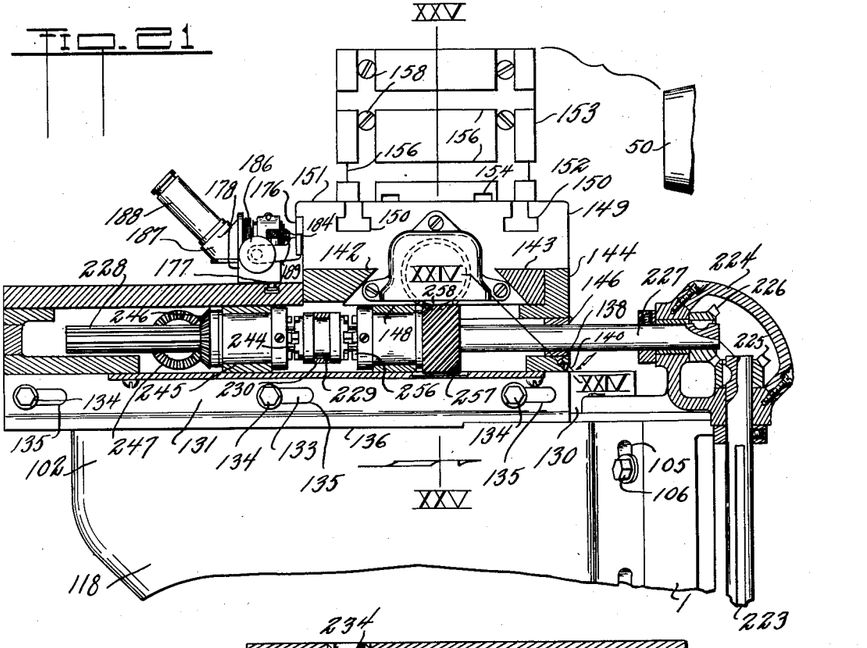
Fig. 21 is a section on the line XXI—XXI, Fig. 19.
Figure 28:
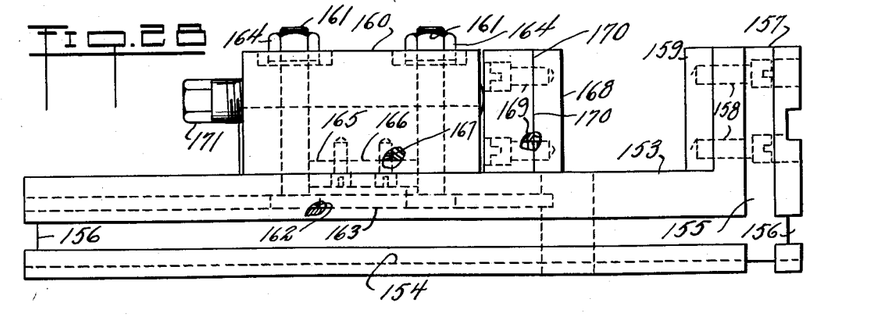
Fig. 28 is a detail view of an auxiliary or primary work table as adapted to be placed at the top or on the tertiary auxiliary frame centrally of Fig. 1 with a vise in position thereon.
Figure 29:
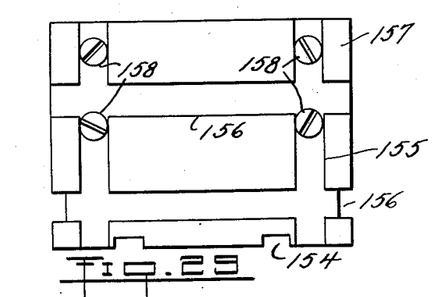
Fig. 29 is an elevation of the device of Fig. 28 from the right.

These primary, secondary and tertiary frames, with their general intersecting-direction guides, thus effectively provide for three dimensional location of a holder to be carried thereby, whether for tool or work. This tertiary auxiliary frame 149 is shown provided with key slots 150 (Fig. 21) in supporting face 151. This supporting face or plane may thus have T-shaped means 152 therein to effect assembly with holder element 153 (Figs. 21, 28). This member 153 has on different sides thereof guide-ways 154, 155, 156, in a plurality of directions for different dimensions, herein shown as three dimension ranges. Accordingly, this vise block may serve as a chuck in three ways, definitely positioning work upon a three-way directed work table relatively to a two direction rotary tool.

Figure 30:
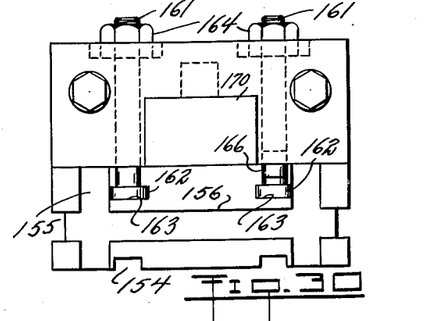
Fig. 30 is a view of the device of Fig. 28 from the left.

This holder element 153 as herein, may form one of the elements of a vise blocks and be of L-form with riser portion 157 through which may extend screws 158 to mount clamping face 159 as one of the jaws of the vise block opposing supplemental block 160 assembled by bolts 161 having heads 162 (Fig. 30) in ways 163 of the element 153. There is thus provision for locating or adjusting the element or block 160 relatively to the element or block 153, and as so adjusted toward and from the face or jaw 159, nuts 164 may be brought to locking position.

Figure 31:
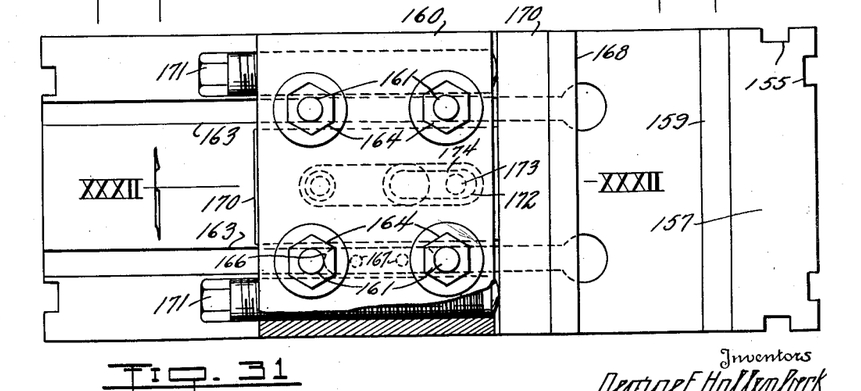
Fig. 31 is a plan view of the device of Fig. 28.

Between these screws 161 there is key way 165 (Figs. 28, 30, 31) in the block 160 for key 166 to protrude into a way 163. This key 166 is anchored with the block 160 by screws 167. This key 166, as projecting into the way 163 between the bolts 161, is an effective aligning means against any regular positioning of the block 160 relatively to the direction which it is desired to have such block take as determined by the way 163.

Figure 32:
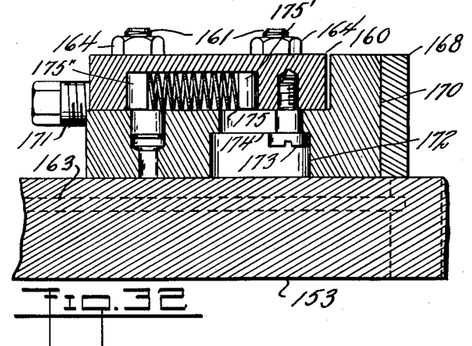
Fig. 32 is a section on the line XXXII—XXXII, Fig. 31.

This block 160 has jaw 168 (Figs. 28, 31, 32) mounted by screws 169 with minor block 170 of L-form, which is adjusted relatively to the major block 160 by screws 171 through the block 160 and abutting the upstanding portion of this L or minor block 170. This minor or L-block 170 has horizontal extension portion with slot 172 therein. In this slot is screw 173 engaging shoulder 174 of the block 170. This screw enters the block 160 and is thus an assembly effecting means between the minor and major blocks so that this minor block 170, as thrust by compression helical spring 175, may cause the jaw 168 yieldably to engage work as between this jaw 168 and the jaw 159 within the limitations permitted by the screw 173. Semicylindrical block 175', adjacent the shoulder 174, provides bearing for one coil of the spring 175, while semicylindrical head 175" is an abutment for the opposite end of this spring 175.

Nicety of placing work herein is of importance, and between the respective frames there is located definite relation-disclosing means in the form of scales or graduations 176 (Figs. 1, 3, 21, 34). In proximity to check a specific position on such scale, a companion member is provided with guide-way 177 in which is located frame 178 mounting barrel 179 having annular graduations 180 to thrust stem 181 as to lineal graduations 182. There is thus definite positioning of this stem 181 relatively to stem 183 in this frame 178 located by set screws 184 against casual disturbance, for these respective set screws 184 may carry spring clips 185 resting on this rod 183; and this rod 183 may be manually axially shiftable by using the head 186 in providing an abutment, say as against work.

Figure 34:
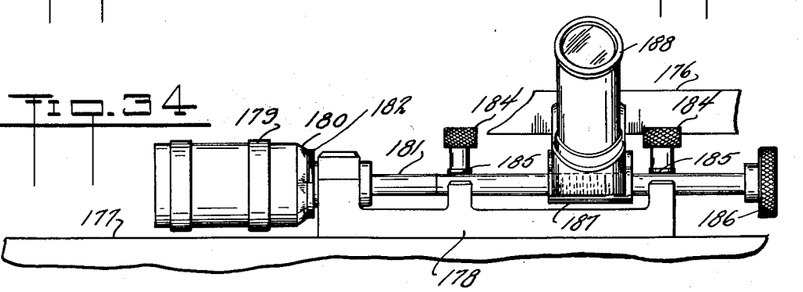
Fig. 34 is the precision checking means adaptable for coaction between successive frames as in series and thereby materially contributing to refinements of operation hereunder.

Mounted on this rod 183 is frame 187 for angularly directed microscope section 188 as to main microscope section 189, thus directed for minute inspection of calibrations for positions between the frames so definitely complementary to the graduations 180, 182. This means that, with the set-up herein and the close connections to avoid play, lineal dimensions of as close as one ten thousandth of an inch may be relied upon and the working of the machine controlled accordingly.

Feed drive

Figures 15, 16, 17, 18:
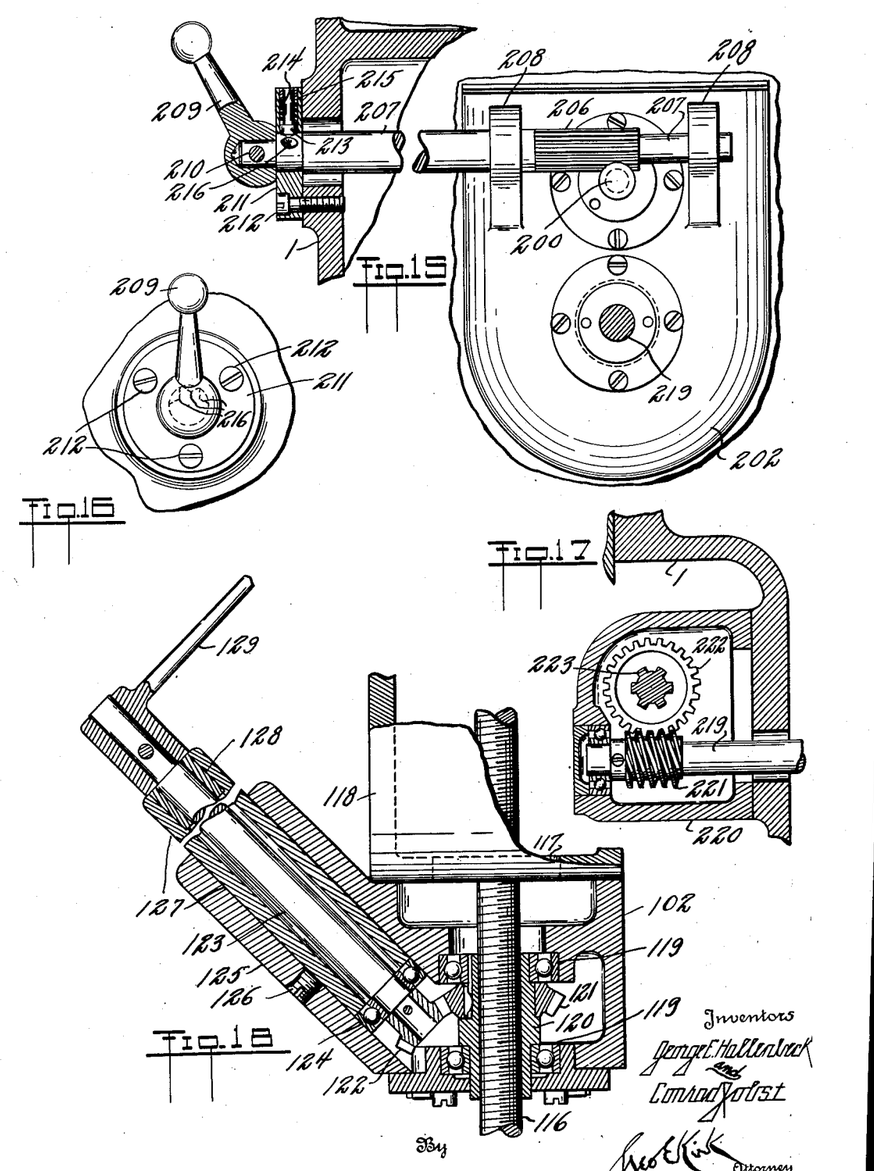
Fig. 15 is a section on the line XV—XV, Fig. 2.
Fig. 16 is a fragmentary view from the left of Fig. 15.
Fig. 17 is a section on the line XVII—XVII, Fig. 2.
Fig. 18 is a vertical section through portions of the manually adjustable means for primary auxiliary frame at the lower left in Fig. 1.

In addition to the tool operation for the rotary holder there may be a feed or movement in operation for supplemental tool or work. To this end, in the main frame 1 (Fig. 2) there may be shelf 190 placing base 191, upon which is mounted the secondary frame 21 carrying motor 192 having shaft 193, having fixed thereon cone or stepped V-pulley 194, from which extends V-belt 195 in housing 196 to oppositely placed or V-cone pulley 197 in bearings 198 of frame section 199. This stepped cone pulley 197 is splined on shaft 200 extending through bearing 201 in frame section 202 within the main frame 1. Fixedly mounted on this shaft 200 adjacent the bearing 201 and between such bearing and the cone pulley 197 are gear 203 and pinion 204. As protruding within the frame 1 from the frame section 201, this shaft 200 has ring collars 205 thereon as a rack in mesh with pinion 206 on shaft 207 (Fig. 15). This shaft 207 extends through guide ears 208 of the frame section 202 and thence outward of the frame 1 on the side toward the controller station or to the left of Fig. 1. Upon this shaft 207 as thus protruding from the frame, there is mounted handle 209, connected to the shaft 207 by pin 210. About this shaft 207 between the handle 209 and the frame 1 is a collar 211 anchored by screws 212 with this frame.

This collar has headed pin 213 normally thrust by spring 214 and acting against shoulder 215 in the collar 211 to have the head of this pin 213 enter a seat 216 in the shaft 207. These several seats 216 (Fig. 16) in the shaft 207 locate this shaft angularly in different positions for holding the shaft 200 in intermediate or nonconnecting position (Fig. 2) or for shifting the gear 203 into mesh with gear 217 for one speed of driving, or for shifting in the reverse direction to bring the pinion 204 into mesh with gear 218 for a lower speed of driving for shaft 219 parallel with the shaft 200 and extending in the frame 1 from the frame section 202, and thence outward of this frame 1. The shaft 219 extends into housing box 220 (Fig. 17). This shaft 219 in this box 220 carries worm 221 in mesh with worm wheel 222, splined to vertically-extending shaft 223 (Figs. 2, 17, 21). This shaft 223 is thus movable with the primary frame 102 relatively to the frame 1 because this shaft 223 is fixed with such frame 102 bearing box 224.

Figures 19, 20:
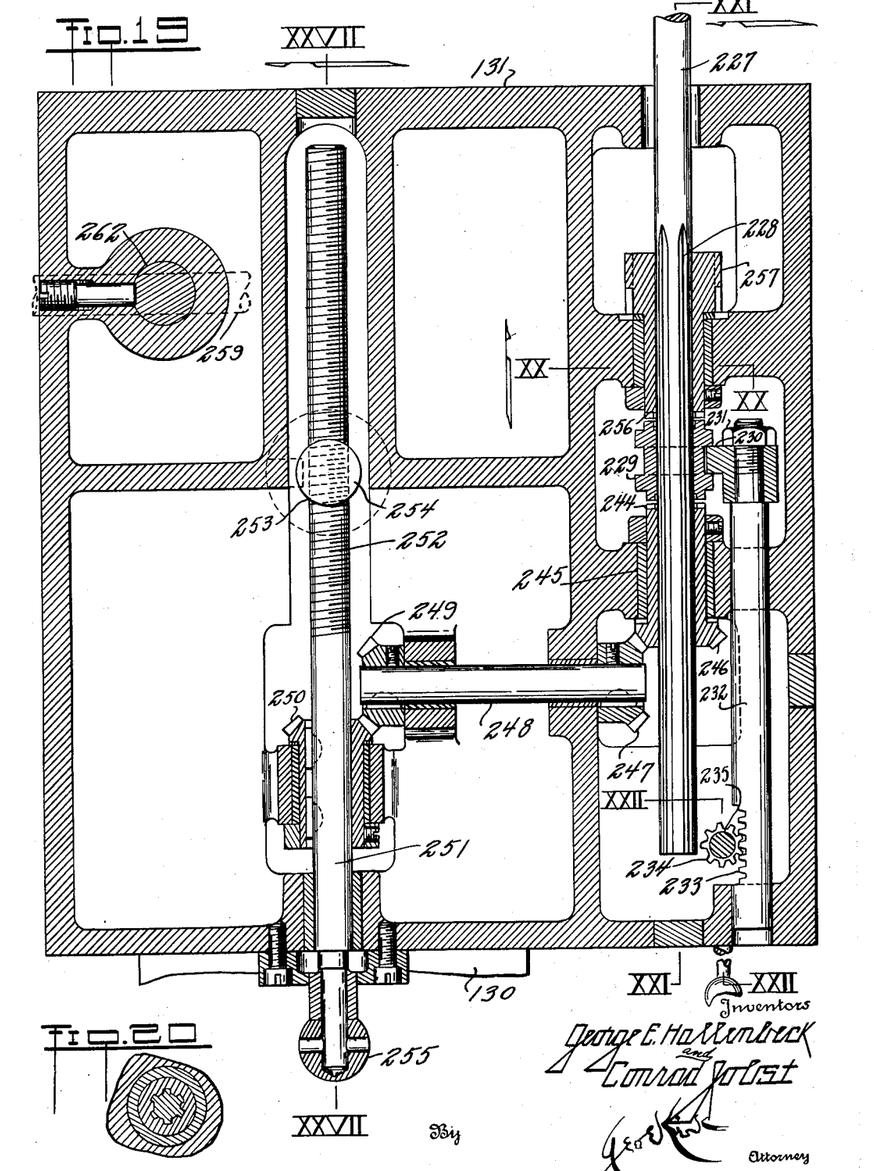
Fig. 19 is a section on the line XIX—XIX, Fig. 1.
Fig. 20 is a section on the line XX—XX, Fig. 19.
Figures 22, 23, 24:
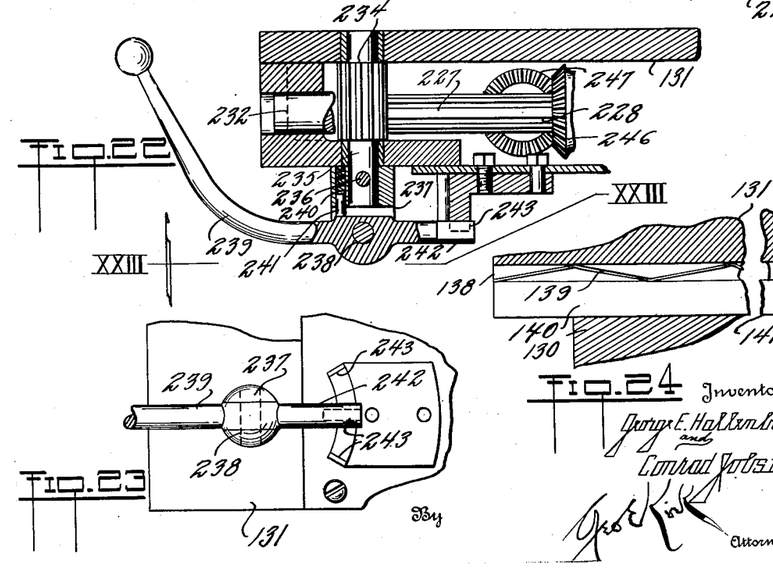
Fig. 22 is a section on the line XXII—XXII, Fig. 19.
Fig. 23 is a fragmentary view from the line XXIII—XXIII, Fig. 22.
Fig. 24 is a partial section on the line XXIV—XXIV, Fig. 21.

In this bearing box 224 bevel pinion 225 is in mesh with bevel pinion 226 on horizontally-extending shaft 227 extending from this primary auxiliary frame 1 into secondary frame 131. This shaft 227 has splined portion 228 (Fig. 19) extending through shiftable clutch member 229, keyed to rotate therewith. This member 229 is engaged by arm 230 mounted by nut 231 on rod 232 extending to rack portion 233 in mesh with pinion 234 (Figs. 19, 22). This pinion 234 is on shaft 235 having pin 236 fixing therewith fork 237. Pin 238 through the fork 237 rockably mounts handle 239. Spring 240, through the action of pin 241, normally locks this handle 239 so that recessed handle extension 242 engages a lug 243 (Figs. 22, 23). At the mid-lug 243 the clutch 229 is unclutched and there is no transmission of the feed drive from the shaft 227.

However, in shifting the handle 239 to be clear of central lug 243 and thence rocking to another lug 243, this shaft 234, the clutch member 239 may be thrown and locked to engage sleeve 244 (Fig. 19). This sleeve is mounted in bearing 245. Fixed with the sleeve 244 is bevel pinion 246 in mesh with bevel pinion 247 keyed with shaft 248, mounted in bearings in the secondary auxiliary frame 131. Fixed with this shaft 248 remote from the bevel gear 247 is bevel pinion 249 in mesh with bevel pinion 250, keyed to shaft 251 parallel to the shaft 227. This shaft 251 is accordingly actuated at a slow speed of rotation and has threaded portion 252 engage internally threaded eye 253 on stem 254 (Figs. 19, 27) mounted in the auxiliary frame 102. This slow speed power drive for rotating this shaft 253, or if so actuated by handle 255, effects a feed or shifting of this secondary auxiliary table 131 horizontally or relatively to the vertical movement of the primary table 102.

Figures 25, 26, 27:
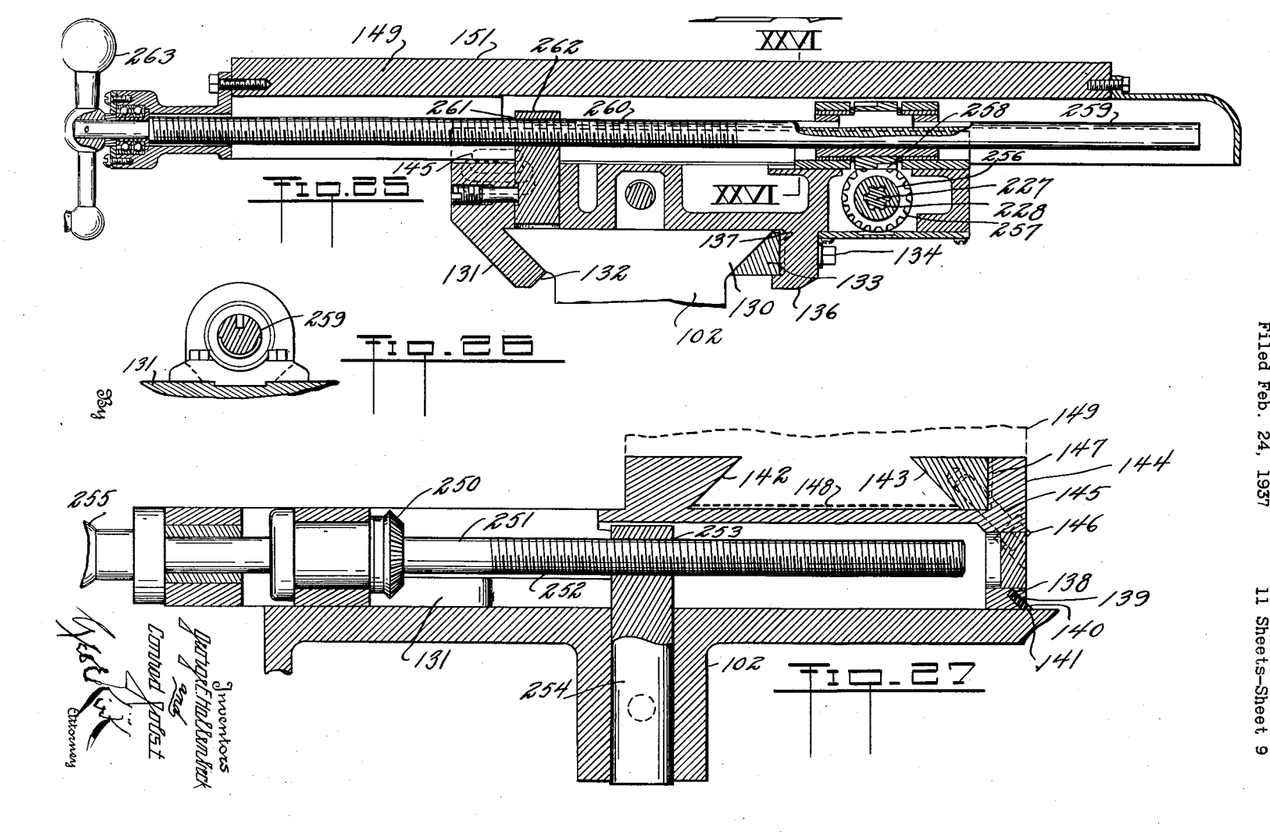
Fig. 25 is a section on the line XXV—XXV, Fig. 21.
Fig. 26 is a section on the line XXVI—XXVI, Fig. 25.
Fig. 27 is a section on the line XXVII—XXVII, Fig. 19.

In the event the shifting of the handle 239 be in the reverse direction from neutral so that the clutch member 229 engages sleeve 256 (Fig. 19), there is driving rotation of spiral pinion 257 (Figs. 19, 21, 25). This pinion 257 is in mesh with spiral gear 258 splined on shaft 259. This shaft has threaded portion 260 engaging internally threaded eye 261 of stem 262 fixed in the secondary frame 131. Accordingly, the slow speed power feed rotation for this shaft 259, or manual rotation thereof effected by handle 263, effects a shifting of the tertiary table 149.

Figure 35:
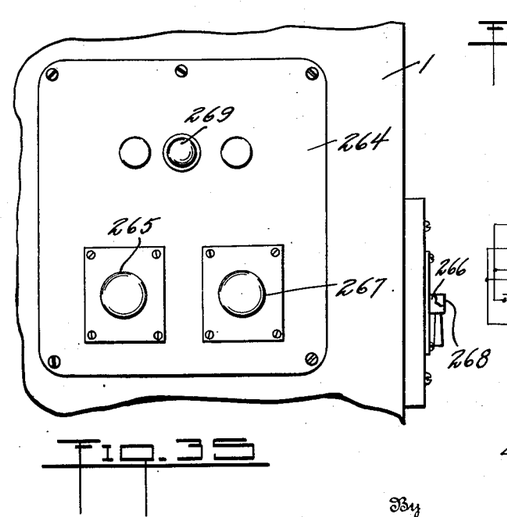
Fig. 35 is a detail view from the right of Fig. 2 of the control box near the operator station.
Figure 36:
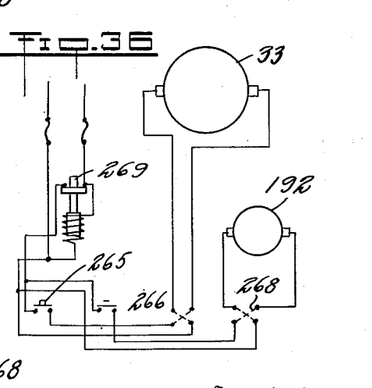
Fig. 36 is a wiring diagram for control electric wiring as adapted to the disclosure hereunder.

Near the rear left of Fig. 1 in convenient position for the various parts of the machine which may at times require manual attention, is operator station where there is located plate 264 on the frame 1 (Fig. 35). These provide starting push button 265 for the motor 33 controlling the tool rotation.

Push button 266 may effect reversal of such rotation for the motor 33 as cut in by the switch 265. Push button 267 may be effective for starting the feed motor 192 for a speed of driving either as adjusted from the handle 209 or by shifting the belt 195 at various positions on the cone pulleys 194, 197. The direction of feed for the selected secondary or tertiary table or auxiliary frame is controlled by reverse effecting push button 268. Safety switch 269 may be used for complete machine cut-out and line power drop which shuts off all current and requires manual re-starting for the machine.

Figure 33:
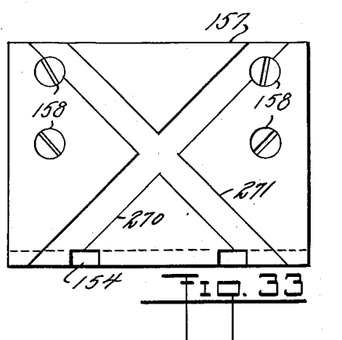
Fig. 33 is a view of a vise element for the device of Fig. 28, having ways angularly, herein shown as 45°, instead of perpendicular as to the varying directions as shown in the three dimensions of the device of Fig. 28.

The rotary holder for the tool, accordingly, has a range of axial travel for different overhang relations as to the work tables and accordingly, effectiveness for locating feed as well as different speeds of such feed. The different direction tables or auxiliary frames for work or tool, whether complementary or for other cooperation, are effective in three dimension placing so that there is range for handling work in full requirements for placement as accessible from the rotary holder axis in the event there is importance for approximately jig relationship in other planes transversely of the axis of the rotary holder. The ways 154, 155, 156, permit definite orientation of this vise with fineness of fully required accuracy possible from delicate jig means, due to the graduation readings possible for determining location and the fact that such location is effective with elimination of any and all play of any degree which might affect accuracy in the product. The direction of the guide-ways in the ultimate work holder or vise are shown (Fig. 28) as in the three planes and at right angles to each other. Special work may warrant departure in direction of ways as angular ways 270, 271 (Fig. 33).

What is claimed and it is desired to secure by Letters Patent is:

1. A main frame, there being intersecting directing guides thereon, a primary and secondary auxiliary frame mounted from each guide, a rotary prime mover on one of the primary frames, independently operable rotation transmission means from the other primary frame, relatively adjustable rotatable means on the secondary frame driven from said respective transmission means, and main-frame-carried control means for said transmission means.

2. A main frame, there being intersecting direction guides thereon, a primary auxiliary frame for each guide, holders, one carried by each auxiliary frame, a drive including a rotary prime mover on the primary frame for rotating one holder, independently rotatable feed means for progressing the other holder, and independent control means at the main frame for said drive and feed means.

3. A main frame, there being intersecting direction guides thereon, a primary auxiliary frame for each guide, a companion frame for one of said primary frames, a rotary prime mover at the companion frame adapted to be shifted therewith relatively to the main frame, controllable transmission means from the drive to the primary frame, a rotary holder carried by the primary frame and connectible to said transmission, a holder mounted by the other primary frame, and independently rotatable feed means including an additional prime mover on the main frame, said means coacting for progressing said latter holder.

4. A main frame, there being intersecting direction guides thereon, a primary auxiliary frame for each guide, a companion frame for one of said primary frames, a rotary prime mover at the companion frame adapted to be shifted therewith relatively to the main frame, variable speed transmission means from the drive to the primary frame, a disconnectible grip carried by the primary frame and adapted to connect a tool therewith, a holder mounted by the other primary frame, and independently rotatable feed means including an additional rotary prime mover on the main frame, said means being effective through the said other primary frame to said latter holder.

5. A main frame, there being intersecting direction guides thereon, a primary auxiliary frame for each guide, a rotary holder carried by one of said auxiliary frames, a rotary prime mover for the rotary holder and mounted with the holder auxiliary frame for shifting relatively to the main frame, adjusting means for positioning the other primary frame relatively to the main frame, and a secondary auxiliary frame on the latter primary frame connected for reciprocation relatively to the latter primary auxiliary frame, and in addition to said prime mover a rotary feed drive from the main frame through said latter primary auxiliary frame to said secondary auxiliary frame, and holder means adapted to mount an article of work with said secondary auxiliary frame in position to be acted upon by a tool carried by the rotary holder.

6. A main frame, there being intersecting direction guides thereon, a primary auxiliary frame for each guide, a rotary holder carried by one of said auxiliary frames, a first prime mover for the rotary holder and mounted with the holder auxiliary frame for shifting relatively to the main frame, adjusting means for positioning the other primary frame relatively to the main frame, and a secondary auxiliary frame on the latter primary frame connected for reciprocation relatively to the latter primary auxiliary frame, a tertiary auxiliary frame connected to said secondary auxiliary frame, a second rotary prime mover providing a feed drive from the main frame through said primary and secondary auxiliary frames to said tertiary auxiliary frame, and holder means adapted to mount an article of work adjustably fixed with said tertiary frame in multiple plane positions to be acted upon by a tool carried by the rotary holder.

7. A main frame, there being intersecting direction guides thereon, a primary auxiliary frame for each guide, a companion frame for one of said primary frames, a rotary prime mover for the companion frame shiftable therewith relatively to the main frame, variable speed transmission means from the drive to the primary frame, a disconnectible grip carried by the primary frame and adapted to connect a tool therewith, a holder mounted by a secondary frame connected for reciprocation relatively to the primary frame, a tertiary auxiliary frame connected to said secondary auxiliary frame, a second rotary prime mover providing feed drive means from the main frame through said primary and secondary auxiliary frames to said tertiary auxiliary frame, means adapted to mount an article of work in different predetermined positions with said tertiary frame to be acted upon by a tool carried by said grip, and frame position and progress definite checking means independent of said drive and feed means for said work.

8. In a machine tool, a main frame, supplemental frames, inter-frame guide means including a groove, spring means in the groove, and yieldable guide-clearing non-metallic wipers against the spring means and thereby projected from such guide means for acting on a complementary guide means.

9. In a machine tool, a main frame, supplemental frames, inter-frame guide means, one of said guide means providing opposing complementary faces, one of said faces being adjustable and tapered lengthwise thereof, and holding means for anchoring the adjustable face in different longitudinal positions for increasing and decreasing play between said faces.

10. In a machine tool, a main frame, supplemental frames, inter-frame guide means, one of said guide means providing opposing complementary faces, one of said faces being adjustable and tapered relatively to its complementary face, and holding means for anchoring the adjustable face in different shifted positions as to the complementary face for increasing and decreasing play between said faces.

11. In a machine tool, a main frame, supplemental frames, inter-frame guide means, one of said guide means providing a pair of inclined longitudinally extending complementary faces, at one of said faces there being a relatively tapered element on a side of a guide-way from a face, and anchoring means for positioning said tapered element in a shifted position longitudinally of said face in taking up varying relation for said face.

12. In a machine tool, a main frame, supplemental frames, inter-frame guide means, one of said guide means providing a pair of inclined longitudinally extending complementary faces, one face including an element shiftable relatively to the guide means, and holding means for positioning the element in different binding relations for said face.

13. A main frame, a plurality of auxiliary frames, inter-frame guide means, there being for an inter-frame guide means yieldable guide clearing wipers anchored in one frame adjacent one guide means for acting on a complementary guide means, a companion frame for one of said primary frames, a rotary prime mover first drive at the companion frame shiftable therewith relatively to the main frame, variable speed transmission means from the drive to the primary frame, a disconnectible grip carried by the primary frame and adapted to connect a tool therewith, a holder mounted by a secondary frame connected for reciprocation relatively to the primary frame, a tertiary auxiliary frame connected to said secondary auxiliary frame, rotary prime mover including second feed drive means from the main frame through said primary and secondary auxiliary frames to said tertiary auxiliary frame independently of the first drive, and means adapted to mount an article of work in different predetermined positions with said tertiary frame to be acted upon by a tool carried by said grip.

14. In a machine tool, a main frame having parallel seat faces, a supplemental relatively movable frame having complemental parallel seat faces forming pairs of inter-frame guide means, there being spacing of the frames between pairs for passage clearway of material fragments as removed in work operation of the tool.

GEORGE E. HALLENBECK.
CONRAD JOBST.